June 9, 1942. R. B. TROGAN 2,285,544
TELLTALE FOR AUTOMOBILE LIGHTS
Filed June 22, 1940
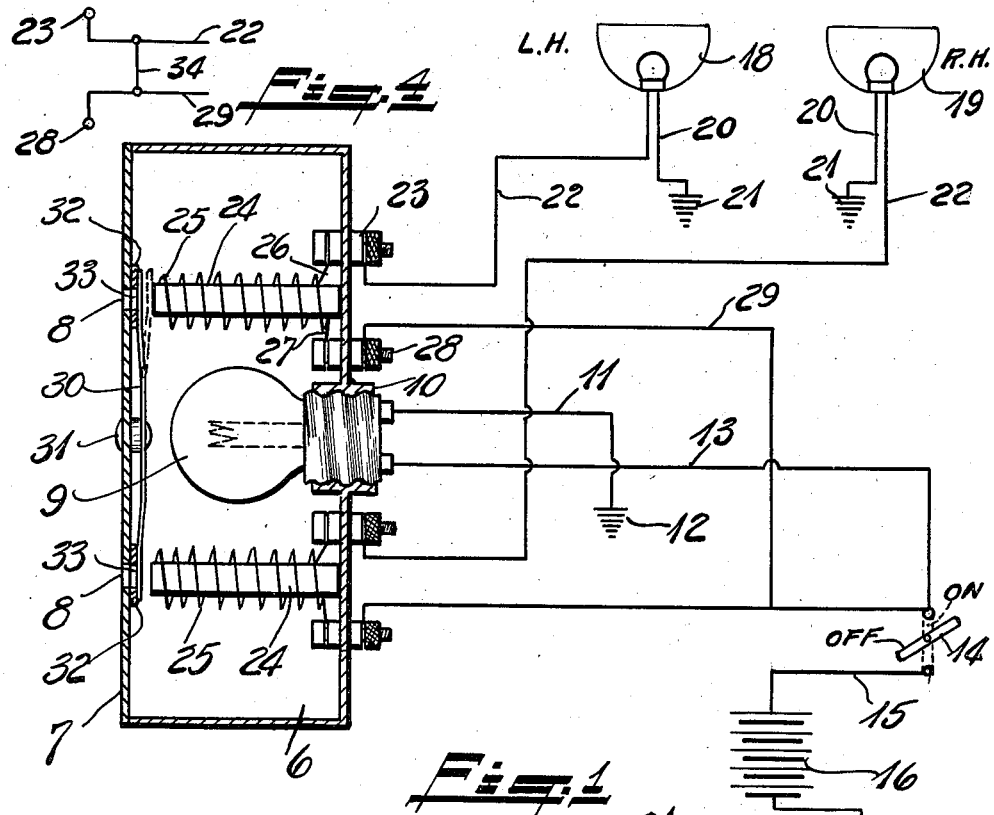
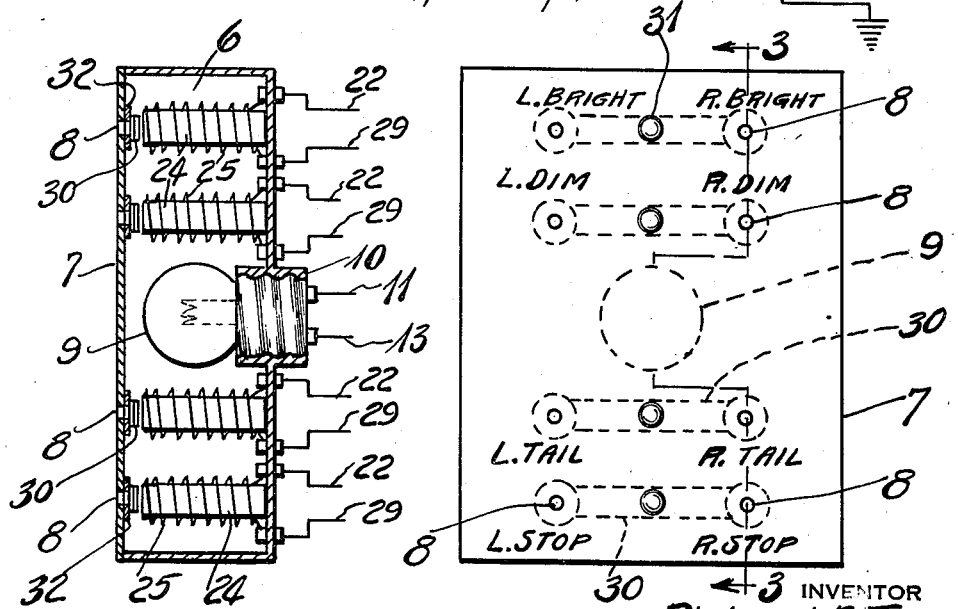
INVENTOR
Richard B. Trogan.
BY
Frank C. Karman.
ATTORNEY Patented June 9, 1942

2,285,544

UNITED STATES PATENT OFFICE 2,285,544

TELLTALE FOR AUTOMOBILE LIGHTS

Richard B. Trogan, Saginaw, Mich.

Application June 22, 1940, Serial No. 341,829

1 Claim. (Cl. 177—329)

This invention relates to telltales for automobile lights and more particularly to a system by means of which the operator can readily detect when one or more of the lights remains de-energized.

One of the prime objects of the invention is to provide simple, practical, and inexpensive means to indicate when any one or more of the several light bulbs of the vehicle lighting circuit remains de-energized after the light switch has been turned to "on" position to energize said circuit.

Another object is to provide a very compact, illuminated telltale means which can be readily mounted on the instrument panel of a vehicle and in position so that the de-energizing of any individual light bulb, due to defective filament or wiring, breakage, loose mounting, or for any other reason, can be readily detected by the vehicle operator.

A further object is to provide a system composed of few and simple parts which are compactly arranged, and to which all of the vehicle lighting bulbs are connected, so that the operator can quickly detect when any one or more of the vehicle lights remains or becomes de-energized.

A still further object is design a system which can be readily applied to automobiles at present in general use, as well as to new automobiles in the process of manufacture.

A further object still is to provide an illuminated cabinet or panel formed with a plurality of openings corresponding to and identifying the various light bulbs in the circuit, and provide means released by the de-energization of the bulb circuit to form a closure and cover for said opening to indicate and warn the operator that this certain light bulb is not energized.

With the above and other objects in view, the present invention consists in the combination and arrangement of parts, hereinafter more fully described, illustrated in the accompanying drawing, and more particularly pointed out in the appended claim, it being understood that changes may be made in the form, size, proportions and minor details of construction, without departing from the spirit, or sacrificing any of the advantages of the invention.

In the drawing:

Fig. 1 is a diagrammatic representation of a lighting system embodying my invention.

Fig. 2 is a face view of the case or housing in which the apparatus is mounted.

Fig. 3 is a sectional edge elevational view through the case and taken on the line 3—3 of Fig. 2.

Fig. 4 shows an alternate arrangement with a shunt circuit.

Many serious accidents have occurred on the highways as the result of the operation, after dark, of an automobile with one or more of its lights de-energized, and in most cases the operator of the offending automobile was unaware that the light or lights in question had failed. This is especially dangerous when one vehicle is overtaking another, in rain or fog, and many accidents occur because of the failure of a tail light. Other accidents are caused by having only one head light energized so that proper road illumination is not secured, and so that the driver of an oncoming car or vehicle cannot determine which headlight is de-energized and thus does not clear the side of the vehicle, if the light that is out is the one on the side toward the middle of the road, and I have therefore designed a very simple, inexpensive, and practical system by means of which the driver can instantly detect which one of the vehicle lights is de-energized or not functioning in a proper manner.

In the drawing wherein for the purpose of illustration is shown one embodiment of my invention, the numeral 6 indicates a case or housing in which the apparatus is mounted, and to facilitate the assembly I have provided a cover 7 provided with a plurality of relatively small openings 8 and for a purpose to be presently described.

A centrally disposed light bulb 9 is mounted in a socket 10 provided in the housing 6 and a conductor 11 is connected to said socket and leads to a ground 12 as usual, while the opposite conductor 13 leads to a light switch 14, thence the conductor 15 connects the switch and vehicle battery 16 so that when the switch 14 is moved to "on" position, this lighting circuit will be energized.

The vehicle head light bulbs are indicated at 18 and 19, these head lights being designated L. H. and R. H. respectively, a conductor 20 being connected to the filament of the bulb 18, and is grounded at 21, the opposite conductor 22 leading to a binding post 23 mounted in the housing.

A plurality of electro-magnet cores 24 are mounted in the housing 6 in direct alignment with the openings 8 provided in the cover 7 and a coil or winding 25 surrounds each core, a conductor 26 connecting the binding post 23 with one end of the winding 25 and a similar conductor 27 connects the opposite end of the winding with a binding post 28, and a conductor wire 29 leads from the post 28 to the vehicle battery to complete the electrical circuit.

The R. H. headlight is connected in an identically similar manner and similar numerals are therefore used to identify similar parts.

Highly resilient magnetic members 30 are mounted on the cover 7 at a point intermediate their length by means of the member 31 and are insulated as usual, these members being so mounted that the ends are disposed directly over the upper ends of the core members 24, and when the lighting switch is in "off" position, the ends of these members 30 bear against the underside of the cover and tightly close the openings 8, but when the light switch is turned to "on" position to energize the circuit, the free ends of the members 30 will be attracted and drawn downwardly against the ends of the electromagnet cores 24, and as indicated in the dotted lines in Fig. 1 of the drawing, thus uncovering the openings 8 so that light from the bulb 9 shines through said opening to indicate to the driver that the headlight or other light in circuit with the electro-magnet directly beneath the opening in question is energized and lighted, which of course holds true for the tail light and all other lights on the vehicle, but should one or more of these lights be defective due to faulty or burned out bulb, defective wiring, or for any other reason, the electro-magnet in circuit with the particular bulb or bulbs will not be energized, and therefor the member 30 which is disposed over this particular magnet will remain in its normal raised position and tightly close the companion opening 8, so that the driver is instantly aware that this certain bulb is not lighted and will therefor take immediate steps to remedy the situation.

In order to eliminate any possibility of light leakage around the openings 8, I provide felt washers 32 on the inner face of the cover 7, and these washers are also provided with a centrally disposed opening 33 in alignment with the openings 8, so that when the ends of the member 30 bear against said washers, there can be no light leakage, and it also eliminates noise caused by snapping of the members 30 when the light switch is turned to "off" position.

It will, of course, be obvious that any required number of lights can be included in the circuit, as the wiring is the same for each and every light.

If desired, and to avoid a drop in voltage when the light circuit is energized, I provide a shunt 34 across the lines 22 and 29 as shown in Fig. 4 of the drawing. This is a matter of choice and can be utilized if desired.

The operation of the system is as follows:

When it is desired or necessary to energize the lighting system, the operator turns the switch 14 to "on" position, this immediately energizes the electro-magnets so that the ends of the members 30 are drawn down and against the ends of the cores 24 so that the light rays from the bulb 9 shine through all of the openings 8, and if for any reason one or more of the openings 8 remains closed, the driver will be aware that the particular bulb or bulbs as indicated on the cover are not energized and lighted and act accordingly.

From the foregoing, it will be obvious that I have perfected a very simple, practical, and inexpensive telltale system by means of which it can be readily determined whether all of the vehicle lights are energized or which one or more, if any, are not energized.

What I claim is:

A visual indicator for automobiles comprising a light-proof closed housing having a plurality of openings in the cover plate thereof; a felt strip surrounding each opening on the inner face of the cover plate, resilient magnetic members mounted on the cover plate at a point intermediate their length, with the free ends normally disposed to form a closure for certain of said openings; an illuminating source in said housing; electro-magnets mounted in said housing in alignment with said openings, said magnets attracting and drawing the free ends of the resilient members downwardly against the ends of the electro-magnet cores to uncover the openings in the cover plate and permit the illuminating source to shine therethrough.

RICHARD B. TROGAN.